(12) United States Patent
Sharma et al.

(10) Patent No.: US 11,796,804 B1
(45) Date of Patent: Oct. 24, 2023

(54) EYE-TRACKING WITH STEERED EYEBOX

(71) Applicant: Meta Platforms Technologies, LLC, Menlo Park, CA (US)

(72) Inventors: Robin Sharma, Redmond, WA (US); Maxwell Parsons, Seattle, WA (US); Andrew John Ouderkirk, Redmond, WA (US); Sascha Hallstein, Saratoga, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/706,467

(22) Filed: Mar. 28, 2022

(51) Int. Cl.
 G02B 27/00 (2006.01)
 G02B 27/01 (2006.01)
 G06F 3/01 (2006.01)

(52) U.S. Cl.
 CPC ....... *G02B 27/0093* (2013.01); *G02B 27/017* (2013.01); *G06F 3/013* (2013.01)

(58) Field of Classification Search
 CPC .... G02B 27/0093; G02B 27/017; G06F 3/013
 See application file for complete search history.

(56) References Cited

U.S. PATENT DOCUMENTS

| | | | |
|---|---|---|---|
| 10,674,143 B2* | 6/2020 | Gruhlke | H04N 13/332 |
| 10,877,556 B2* | 12/2020 | Berkner-Cieslicki | G02B 27/0172 |
| 11,157,072 B1* | 10/2021 | Topliss | G06V 20/20 |
| 11,262,580 B1* | 3/2022 | Topliss | G02B 26/101 |
| 2015/0277123 A1* | 10/2015 | Chaum | G02B 27/017 348/62 |
| 2015/0378164 A1* | 12/2015 | Bailey | G02B 27/017 359/633 |
| 2016/0223819 A1* | 8/2016 | Liu | G06F 3/013 |
| 2018/0332275 A1* | 11/2018 | Gruhlke | H04N 13/383 |
| 2019/0037183 A1* | 1/2019 | Xu | H04N 9/3194 |
| 2019/0050051 A1* | 2/2019 | Cirucci | G02B 5/08 |
| 2022/0082830 A1* | 3/2022 | Tu | A61B 3/113 |

OTHER PUBLICATIONS

U.S. Appl. No. 17/374,888, inventors Gollier; Jacques et al., filed Jul. 13, 2021.
U.S. Appl. No. 17/378,467, inventors Peng; Fenglin et al., filed Jul. 16, 2021.
U.S. Appl. No. 17/383,245, inventors Gollier; Jacques et al., filed Jul. 22, 2021.
U.S. Appl. No. 17/401,069, inventors Peng; Fenglin et al., filed Aug. 12, 2021.

* cited by examiner

*Primary Examiner* — Bryan Earles
(74) *Attorney, Agent, or Firm* — FREESTONE INTELLECTUAL PROPERTY LAW PLLC; Aaron J. Visbeek

(57) ABSTRACT

Illumination light is emitted from a light source. The illumination light is directed to an eyebox region via a lightguide. Illumination light and visible light beams are incoupled into the lightguide by a tiltable reflector. A tracking signal is generated with a sensor in response to a returning light becoming incident on the sensor.

20 Claims, 6 Drawing Sheets

EYE-TRACKING WITH STEERED EYEBOX

TECHNICAL FIELD

This disclosure relates generally to optics, and in particular to eye-tracking.

BACKGROUND INFORMATION

Smart devices may include one or more electronic components for use in a variety of applications, such as gaming, aviation, engineering, medicine, entertainment, video/audio chat, activity tracking, and so on. Some smart devices, such as head mounted displays (HMDs), may perform eye-tracking which may enhance the user's viewing experience. Thus, some smart devices may incorporate an eye-tracking system for tracking movements of the user's eye.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
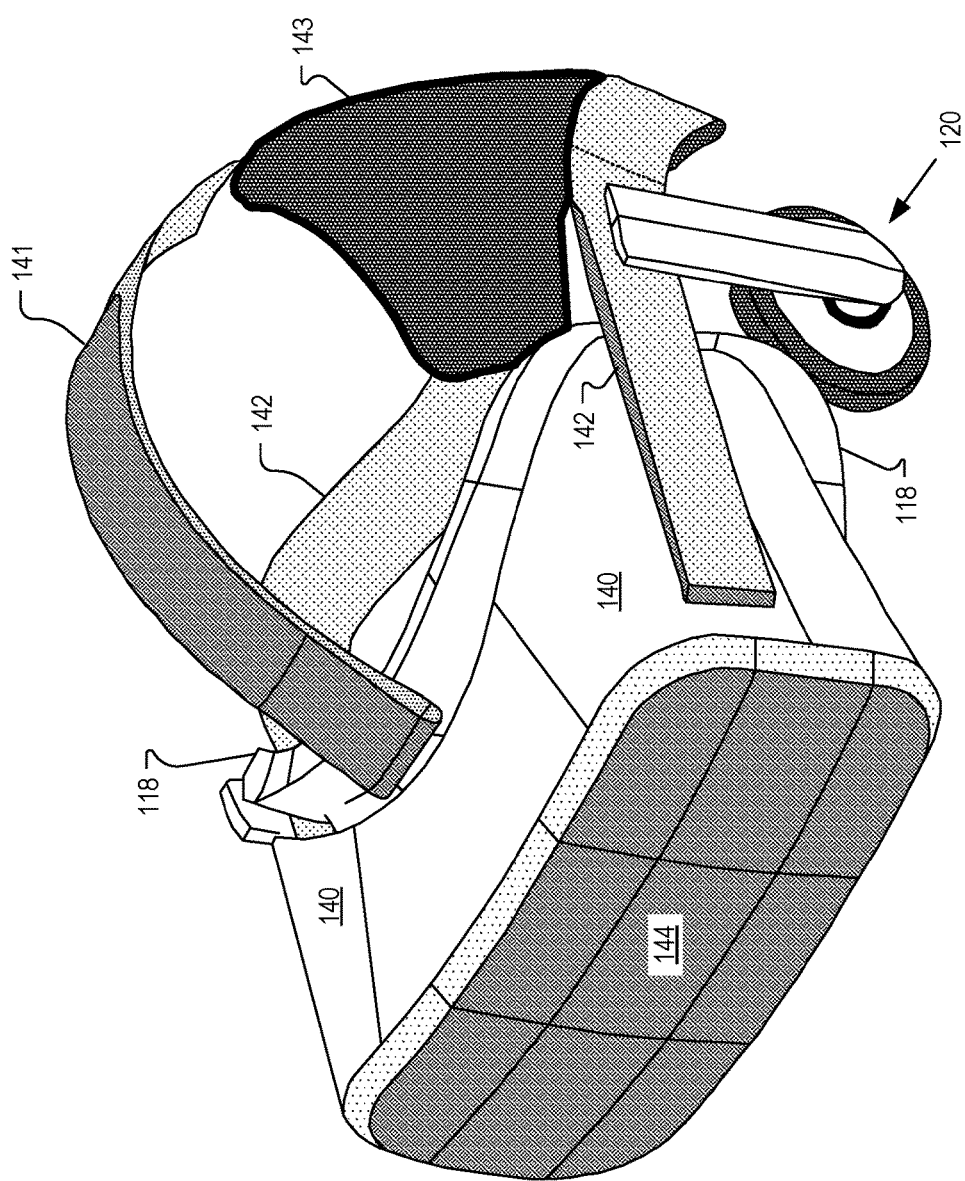
FIG. 1 illustrates an example head mounted display (HMD), in accordance with aspects of the disclosure.

Embodiments of eye-tracking with a steered eyebox are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 μm.

In aspects of this disclosure, the term "transparent" may be defined as having greater than 90% transmission of light. In some aspects, the term "transparent" may be defined as a material having greater than 90% transmission of visible light.

Implementations of the disclosure include a near-eye optical system that includes a lightguide, tiltable reflector, an infrared light source, and a sensor configured to generate a tracking signal in response to returning infrared light. The tiltable reflector may be a microelectromechanical system (MEMS) tiltable mirror, in some implementations. The tiltable reflector receives visible light beams and infrared illumination light and directs the visible light beams and the infrared illumination light to an eyebox region, via the lightguide. The visible light beams are for presenting virtual images to the eyebox region and the infrared illumination light is for eye-tracking purposes. Both the visible light beams and the infrared illumination light utilize the tiltable reflector and the lightguide to propagate to the eyebox region. The sensor receives returning infrared light, which is the infrared illumination light reflecting or scattering from the eyebox region. The sensor generates a tracking signal in response to the returning infrared light. Processing logic may receive the tracking signal and drive the tiltable reflector to a particular position in response to receiving the tracking signal generated by the sensor. Driving the tiltable reflector to different positions, may change a position of a steerable eyebox so that a pupil of a user's eye is provided with virtual images where the pupil is actually located. Changing the position of the steerable eyebox using the tiltable reflector then also steers the infrared illumination light to the steerable eyebox since the infrared illumination light and the visible light beams are directed to the eyebox region by the tiltable reflector. These and other embodiments are described in more detail in connection with FIGS. 1-6.

FIG. 1 illustrates an example head mounted display (HMD) 100 including a top structure 141, a rear securing structure 143, and a side structure 142 attached with a viewing structure 140, in accordance with implementations of the disclosure. The illustrated HMD 100 is configured to be worn on a head of a user of the HMD. In one implementation, top structure 141 includes a fabric strap that may include elastic. Side structure 142 and rear securing structure 143 may include a fabric as well as rigid structures (e.g. plastics) for securing the HMD to the head of the user. HMD 100 may optionally include earpiece(s) 120 configured to deliver audio to the ear(s) of a wearer of HMD 100.

In the illustrated embodiment, viewing structure 140 includes an interface membrane 118 for contacting a face of a wearer of HMD 100. Interface membrane 118 may function to block out some or all ambient light from reaching the eyes of the wearer of HMD 100. Viewing structure may include a display side 144 that is proximate to a display panel that generates virtual images for presenting to an eye of a user of HMD 100.

Example HMD 100 also includes a chassis for supporting hardware of the viewing structure 140 of HMD 100. Hardware of viewing structure 140 may include any of processing logic, wired and/or wireless data interface for sending and receiving data, graphic processors, and one or more memories for storing data and computer-executable instructions. In one implementation, viewing structure 140 may be configured to receive wired power. In one implementation, viewing structure 140 is configured to be powered by one or more batteries. In one implementation, viewing structure 140 may be configured to receive wired data including video data. In one implementation, viewing structure 140 is configured to receive wireless data including video data.

Viewing structure 140 may include a steerable display system that steers the virtual images to a pupil position of an eye of a user. This may allow the display system to increase the resolution of the virtual images as well as reduce power consumption of the display system by providing the virtual images to a smaller steerable eyebox than prior display systems, among other potential advantages. The steerable display system may also include an eye-tracking module to allow the display system to steer the virtual images to the pupil location of the user. The implementations of this disclosure may also be implemented in augmented reality (AR) HMDs and Mixed Reality (MR) HMDs, in addition to the illustrated virtual reality (VR) HMD of FIG. 1.

Figure 2:
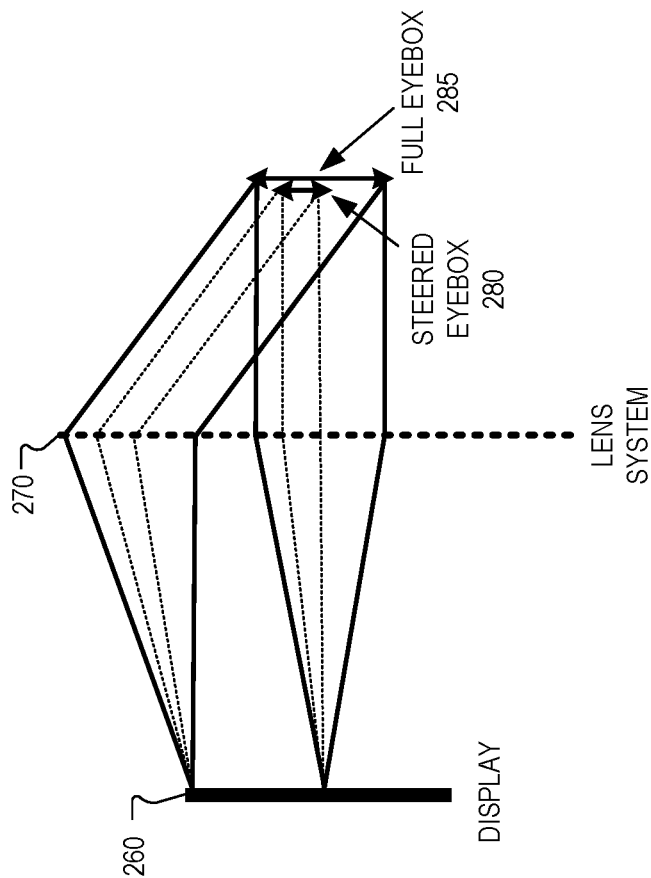
FIG. 2 illustrates a pupil steering concept diagram that includes a display layer and a lens system, in accordance with aspects of the disclosure.

FIG. 2 illustrates a pupil steering concept diagram 200 that includes a display layer 260 and a lens system 270, in accordance with implementations of the disclosure. Diagram 200 illustrates presenting virtual images to a steered eyebox 280 that is smaller than a full eyebox 285. In prior near-eye display architectures, the virtual image is presented to a full eyebox 285 so that an eye is able to view the virtual image in a wide variety of pupil positions. This prior display architecture (with the full eyebox 285) can be achieved without eye-tracking input. However, pupil steering displays benefit from eye-tracking to sense the position of the pupil so that the virtual image can be presented in the smaller steered eyebox that matches the pupil position. In FIG. 2, display 260 generates a virtual image and the virtual image propagates to the steered eyebox 280 by way of lens system 270. Lens system 270 may be a single refractive lens or a more complex lens system that includes a plurality of lensing elements, polarizers, waveplates (e.g. quarter waveplates), and/or half-mirrors.

Figure 3:
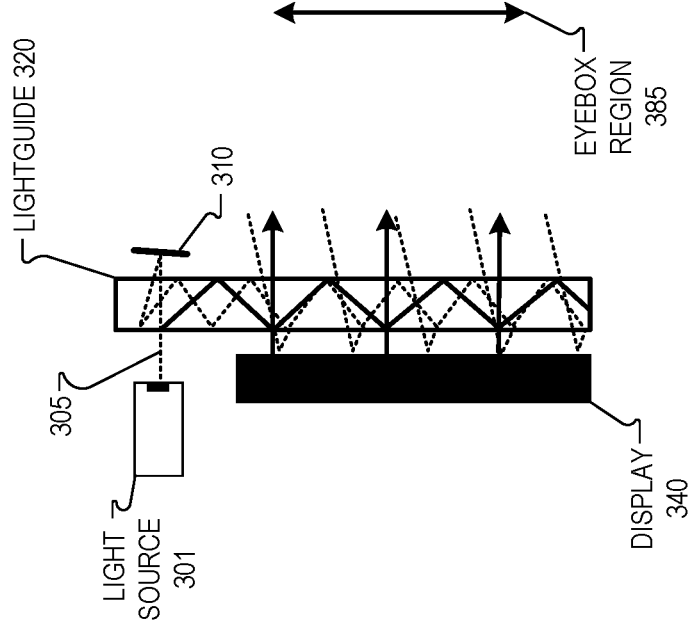
FIG. 3 illustrates a display system that includes a light source, a tiltable reflector, a lightguide, and a display panel, in accordance with aspects of the disclosure.

FIG. 3 illustrates a display system 300 that includes a light source 301, a tiltable reflector 310, a lightguide 320, and a display panel 340, in accordance with implementations of the disclosure. Display system 300 may also include a lens system (not specifically illustrated) similar to lens system 270 disposed between lightguide 320 and eyebox region 385. Light source 301 may emit a plurality of narrow-band wavelengths such as red, green, and blue. Light source 301 may include one or more laser sources, in some implementations.

In operation, tiltable reflector 310 receives the light 305 from light source 301 and redirects light 305 into lightguide 320. Tiltable reflector 310 may be a MEMS mirror, for example. The light propagates in lightguide 320 and is outcoupled to display panel 340. Display panel 340 may be a spatial light modulator such as a reflective liquid-crystal-on-silicon (LCOS). Display panel 340 generates a virtual image by spatially modulating the light incident on the display panel and that virtual image is directed to an eyebox region 385. Tiltable reflector 310 is able to "steer" the steerable eyebox to different pupil locations by adjusting the angle that the light is redirected into lightguide 320. Hence, to "steer" the smaller steerable eyebox to the bottom of the eyebox region 385, tiltable reflector 310 may direct the light into lightguide 320 at a steeper angle and to "steer" the steerable eyebox to the top of the eyebox region 385, tiltable reflector 310 may direct the light into lightguide 320 at a shallower angle.

Lightguide 320 may include an incoupling optical element and an outcoupling optical element (not specifically illustrated). The incoupling optical element and the outcoupling optical element may be holographic optical elements. The light propagating in lightguide 320 between the incoupling element and the outcoupling element may be confined in lightguide 320 by total internal reflection (TIR) until the outcoupling element outcouples the light to be incident on display panel 340. Display panel 340 directs the visible light (including the virtual image) to the eyebox region 385.

Figure 4A:
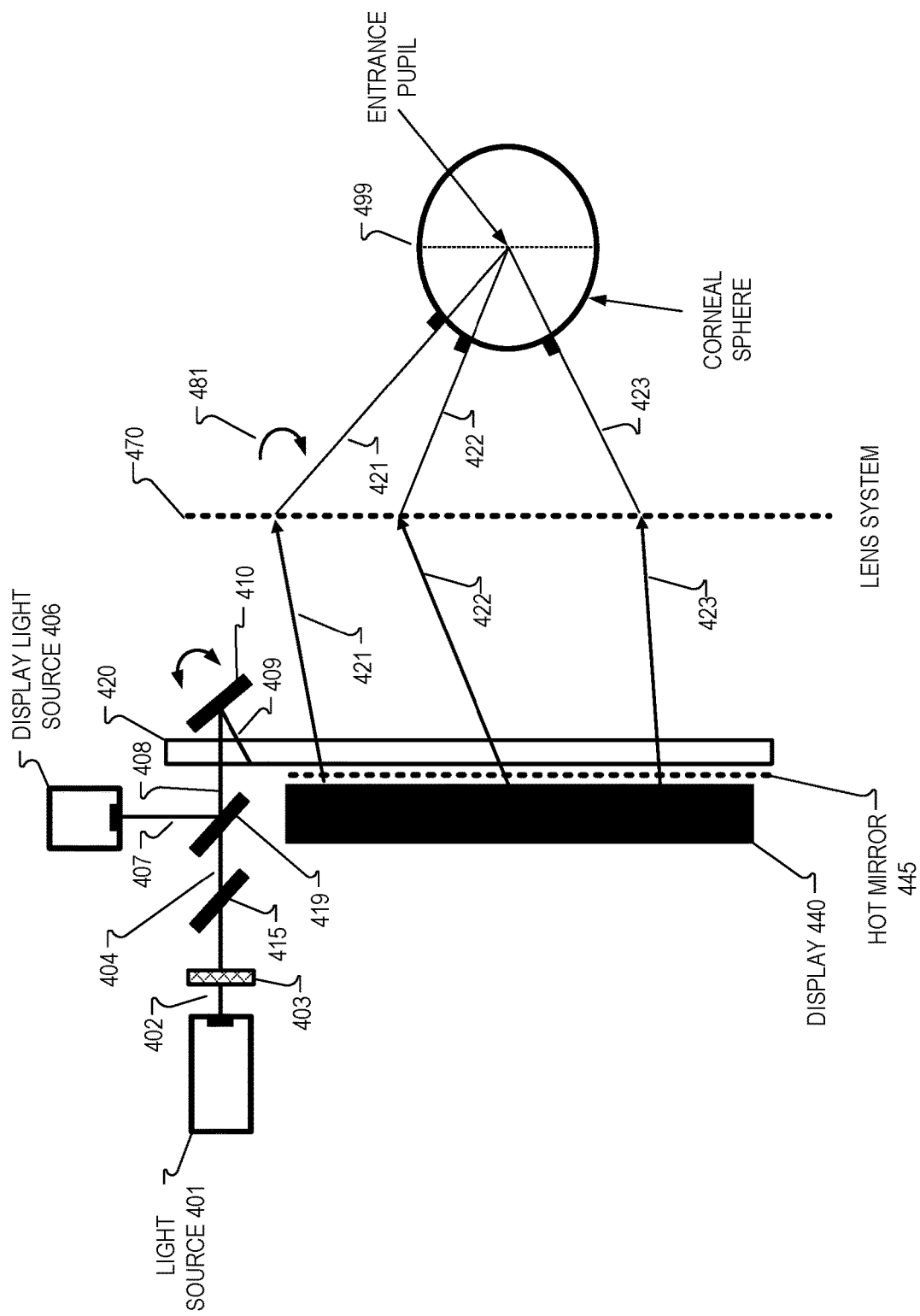
FIG. 4A illustrates illumination elements of a near-eye display system, in accordance with aspects of the disclosure.

FIG. 4A illustrates illumination elements of a near-eye display system 400 including a light source 401, a tiltable reflector 410, a lightguide 420, a display panel 440, and a lens system 470, in accordance with implementations of the disclosure. Display system 400 may optionally include a polarizer 403 and/or a hot mirror 445. Display system 400 may also include a display light source 406 and a dichroic beam splitter 419, as illustrated in FIG. 4A.

In operation, light source 401 emits illumination light 402. Illumination light 402 may be infrared illumination light. Light source 401 may be a laser source. Light 402 may be polarized or mostly polarized as it is emitted by light source. Optional polarizer optical element 403 may ensure that light 402 is polarized to a particular polarization orientation. Illumination light 402 propagates to polarized beam splitter (PBS) 415. PBS 415 is configured to pass a first polarization orientation of illumination light 402 and reflect a second polarization orientation that is orthogonal to the first polarization orientation of illumination light 402.

Illumination light 404 that passes through PBS 415 encounters dichroic beam splitter 419. Dichroic beam splitter 419 passes the wavelength of light of illumination light 404 and reflects other wavelengths. In implementations where illumination light 404 is infrared light (e.g. 850 nm or 940 nm), dichroic beam splitter 419 is configured to pass infrared light and reflect visible light (or at least the red, green, and blue wavelength bands of light 407). Where illumination light 404 is visible light, dichroic beam splitter 419 may be configured to pass a narrow-band of visible wavelengths corresponding to the particular wavelength of illumination light 404. Dichroic beam splitter 419 is also configured to reflect one or more visible wavelengths of light 407 emitted by display light source 406. For example, dichroic beam splitter 419 may be configured to pass red, green, and blue wavelengths where display light source 406 emits red, green, and blue wavelengths of light 407. Dichroic beam splitter 419 may be positioned to pass light 404 and reflect light 407 such that the respective lights propagate along a same optical path to tiltable reflector 410. Hence, in some implementations, infrared illumination light 404 will propagate to tiltable reflector 410 along the same optical path as visible light beams (e.g. red, green, and blue light beams). Light 408 represents light 407 and light 404 propagating along a same optical path.

Tiltable reflector 410 may be a two-dimensional MEMS scanner mirror. Tiltable reflector 410 is configured to receive the visible light beams and redirect the visible light beams to lightguide 420. The visible light beams incoupled into lightguide 420 propagate in lightguide 420 and are outcoupled onto display 440, which generates virtual images that are directed to eyebox region 499. Display 440 may be a reflective LCOS, for example. Depending on where the steerable eyebox is steered to, the virtual image generated by display 440 may propagate along example optical path 421, 422, or 423. Optical path 421 may correspond to a steered eyebox for an eye that is looking straight up (based on pupil location of the eye), optical path 422 may correspond to a steered eyebox for an eye that is gazing slightly up, and optical path 423 may correspond to a steered eyebox for an eye that is looking slightly down. Processing logic 497 of FIG. 4B may drive tiltable reflector 410 to a particular position to move the steerable eyebox to the pupil location of an eye in response to a tracking signal 493 generated by eye-tracking sensor 490.

Referring again to FIG. 4A, tiltable reflector 410 is also configured to receive the illumination light and redirect the illumination light to eyebox region 499 via lightguide 420. The illumination light incoupled into lightguide 420 propagates in lightguide 420 and is outcoupled toward display 440 and reflected along a same/similar optical path as the visible light beams that carry the virtual image. In other words, the illumination light and the visible light beams are directed to the same steered eyebox. In the illustrated implementation, optional hot mirror 445 may be disposed between the lightguide 420 and display 440. In this implementation, the hot mirror 445 is configured to reflect infrared illumination light and pass visible light wavelengths to display panel 440. Hot mirror 445 may be a more efficient way of directing infrared illumination light to the steerable eyebox when compared to relying on display panel 440 to direct the infrared illumination light to the steered eyebox.

Lens system 470 may be configured similarly to the aspects described with respect to lens system 270. Due to the optical features of lens system 470, light propagating to eyebox region 499 may be a particular circular polarization orientation 481 (e.g. right-hand circularly polarized). A portion of the light will reflect off of the cornea of the eye and be reflected at a circular polarization orientation that has an opposite handedness (e.g. left-hand circularly polarized) to the circular polarization orientation 481.

The cornea has an aperture size of approximately 12 mm. Although the cornea of an eye is not truly spherical over the entire aperture, it is approximately spherical over the central 5 mm. The radius of the curvature of the cornea is approximately the same as the distance of the entrance pupil to the corneal apex and the entrance pupil is located at roughly the center of the corneal sphere. Thus, for a well-steered display, the chief rays of the virtual image converging upon the pupil will also be a near-normal angle of incidence to the corneal surface. This near-normal angle of incidence allows for infrared illumination light that follows the same/similar optical path as the virtual image to reflect back of the cornea with a reasonably strong intensity.

Figure 4B:
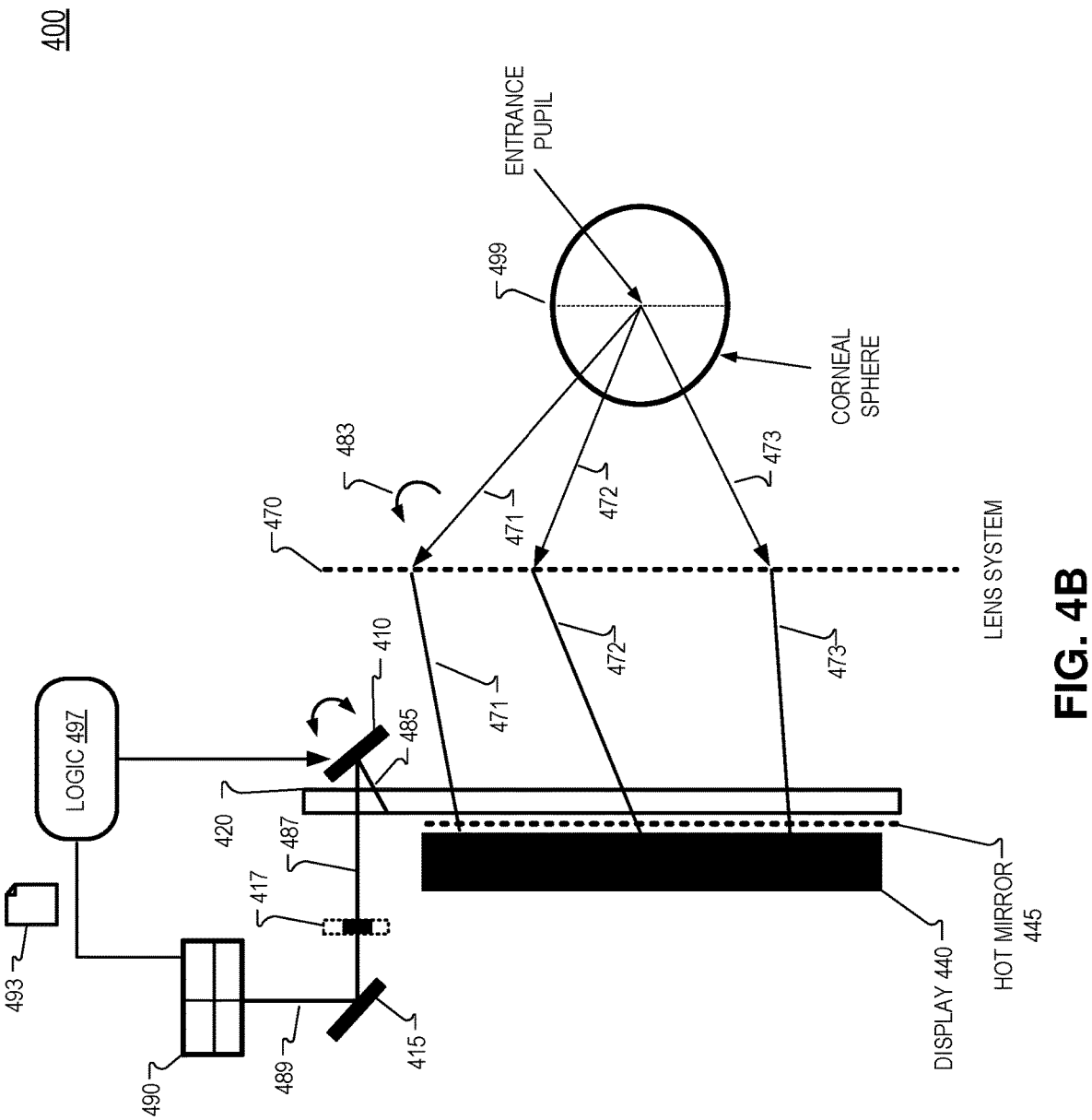
FIG. 4B illustrates a sensing optical path of a near-eye display system, in accordance with aspects of the disclosure.

FIG. 4B illustrates a sensing optical path of a near-eye display system 400, in accordance with implementations of the disclosure. Returning light 483 is the portion of the illumination light that is reflected of cornea off of the eye. Returning light 483 follows the opposite optical path that delivered the illumination light to the eye. That is, returning light 483 propagates through lens system 470, reflects off of display 440 (or hot mirror 445) and into lightguide 420. If the illumination light was delivered along optical path 421, the return optical path would follow optical path 471 (the reverse of optical path 421). Similarly, illumination light delivered along optical path 422 would return along return optical path 472 and illumination light delivered along optical path 423 would return along return optical path 473.

Lightguide 420 is configured to receive the returning light from the eyebox region 499 (via display 440 or hot mirror 445) and direct the returning light to the tiltable reflector 410. The returning light that exits lightguide is light 485 in FIG. 4B. Light 485 is directed toward PBS 415 by tiltable reflector 410 as light 487. Light 487 has a second polarization orientation that is orthogonal to the first polarization orientation of light 402 of FIG. 4A. Therefore, light 487 is reflected by PBS 415 as returning light 489 which becomes incident on sensor 490. An optional stop element 417 is positioned in the optical path between tiltable reflector 410 and PBS 415 to reduce stray light that would be directed to sensor 490 by PBS 415.

Sensor 490 may be a single photodiode. Sensor 490 may include a plurality of photodiodes. Sensor 490 may include a quad sensor, an image sensor, or a charge-coupled device (CCD) light sensor. An infrared filter that passes a narrowband infrared light emitted by light source 401 (and rejects other wavelengths) may be positioned in front of sensor 490 so that it only measures the wavelength of light 402. Sensor 490 is configured to generate a tracking signal 493 in response to returning infrared light 489 becoming incident onto the sensor via tiltable reflector 410.

Processing logic 497 is configured to drive tiltable reflector 410 to a particular position in response to receiving tracking signal 493. In an implementation, processing logic 497 is configured to drive tiltable reflector 410 to a position that generates a highest intensity of the returning infrared light 489 incident on sensor 490. An intensity of the returning infrared light 489 may be included in tracking signal 493. Driving tiltable reflector 410 to the position that generates the highest intensity signal of returning light 489 will usually correspond with directing the illumination light (and consequently the visible light) to the middle of the corneal sphere where the strongest (near-normal) reflection of the returning light will occur.

In an implementation, processing logic 497 is configured to drive tiltable reflector 410 to a position that centers the returning infrared light 489 to a middle of sensor 490. A position of the returning infrared light 489 with respect to a middle of sensor 490 may be included in tracking signal 493.

Figure 5:
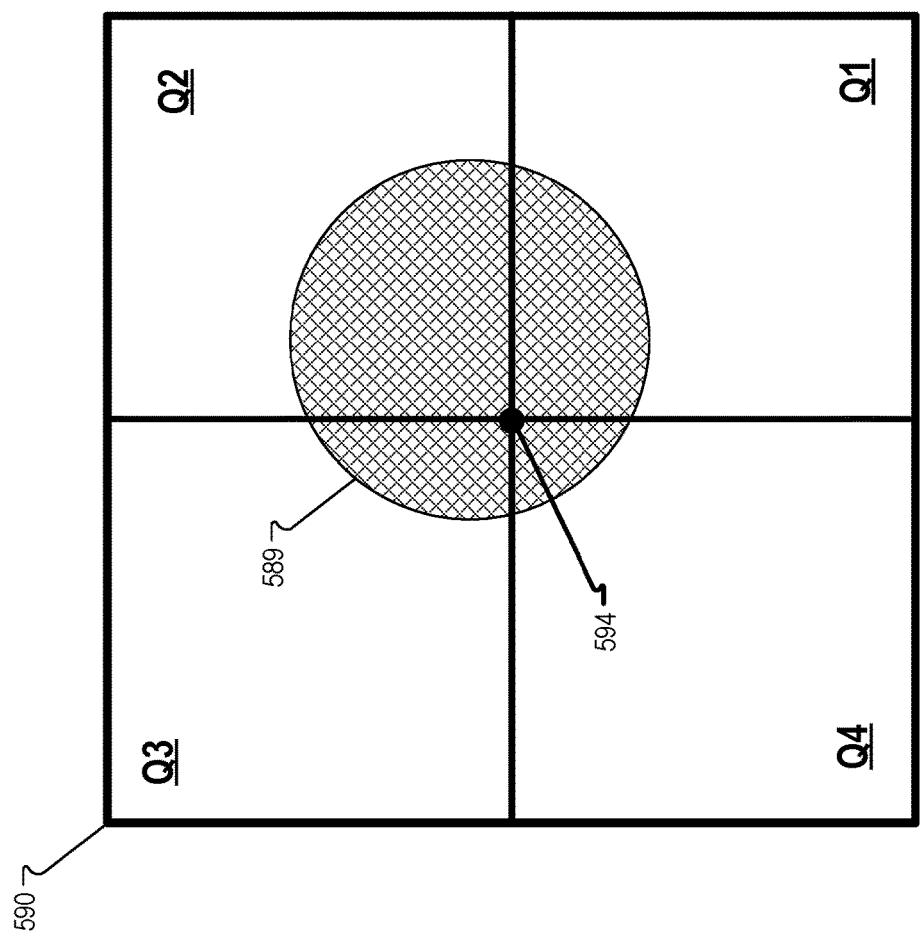
FIG. 5 illustrates an example quad sensor that may be used as a sensor, in accordance with aspects of the disclosure.

FIG. 5 illustrates an example quad sensor 590 that may be used as sensor 490, in accordance with implementations of the disclosure. Example quad sensor 590 includes quadrature Q1, quadrature Q2, quadrature Q3, and quadrature Q4. By measuring the intensity of the signal of the four quadratures, a positioning of the returning light 589 with respect to a middle 594 of the sensor 590 can be determined. When returning light 589 is centered with respect to the middle 594, each quadrature may output a same signal level, for example. Thus, processing logic 497 can drive tiltable reflector 410 to center returning light 589 with respect to the middle 594 of sensor 590. Centering returning light 589 on sensor 590 may correspond with moving the steerable eyebox to where the pupil of the eye is.

Figure 6:
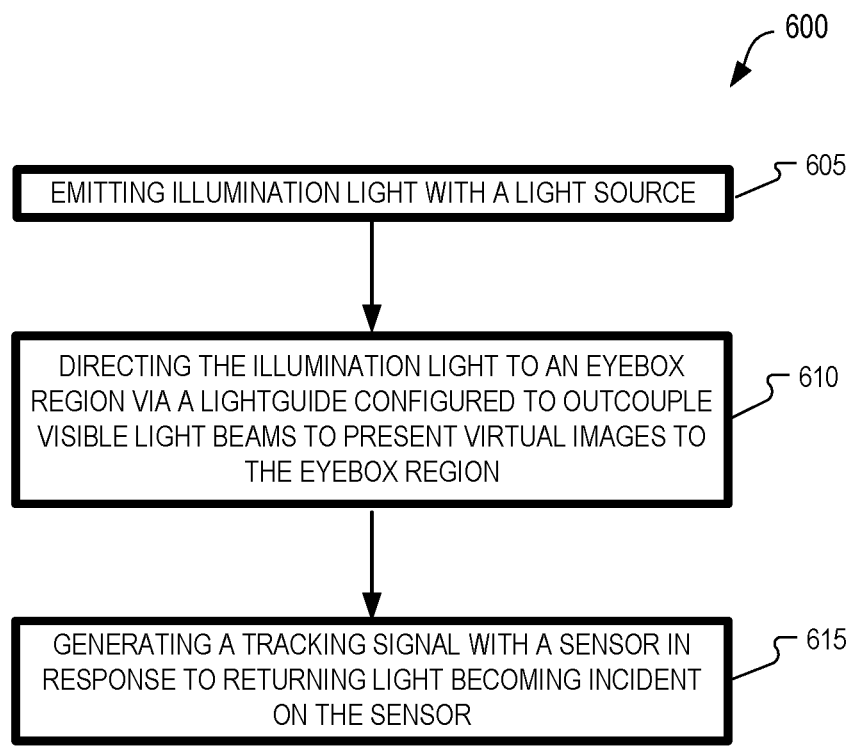
FIG. 6 illustrates a flow chart of a method of generating an eye-tracking signal, in accordance with aspects of the disclosure.

FIG. 6 illustrates a flow chart of a process 600 of generating an eye-tracking signal, in accordance with implementations of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

In process block 605, illumination light is emitted by a light source (e.g. light source 401). The illumination light may be infrared illumination light or visible illumination light. The illumination light may be polarized.

In process block 610, the illumination light is directed to an eyebox region via a lightguide (e.g. lightguide 420) configured to outcouple visible light beams (e.g. light 407) to present virtual images to the eyebox region. The illumination light and the visible light beams are both incoupled into the lightguide by a tiltable reflector (e.g. tiltable reflector 410).

In process block 615, a tracking signal (e.g. tracking signal 493) is generated with a sensor in response to returning light (e.g. light 489) becoming incident on the sensor. The returning light is the illumination light being reflected or scattered by the eyebox region. The returning light propagates along a return optical path that encounters the lightguide and then the tiltable reflector prior to impinging on the sensor.

In some implementations, process 600 further includes driving the tiltable reflector to a particular position in response to receiving the tracking signal generated by the sensor.

In some implementations, process 600 may further include driving the tiltable reflector to a position that centers the returning light to a middle of the sensor and generates a highest intensity of the returning light incident on the sensor. A positioning of the returning light with respect to the sensor and an intensity of the returning light may be included in the tracking signal.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. processing logic 497) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I$^2$C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A near-eye optical system, comprising:
   a lightguide;
   a tiltable reflector configured to receive visible light beams and redirect the visible light beams into the lightguide at a first angle, wherein the lightguide is configured to outcouple the visible light beams to present virtual images to a steerable eyebox located at a first position within an eyebox region;
   an infrared light source configured to emit infrared illumination light, wherein the tiltable reflector is configured to redirect the infrared illumination light to the eyebox region via an optical path within the lightguide; and
   a sensor configured to generate a tracking signal in response to returning infrared light becoming incident onto the sensor via the tiltable reflector, wherein the tracking signal indicates a pupil position,
   wherein the lightguide is configured to receive the returning infrared light from the eyebox region, propagate the returning infrared light along the optical path within the lightguide, and direct the returning infrared light to the tiltable reflector, and
   wherein in response to the tracking signal, the tiltable reflector is configured to redirect the visible light beams into the lightguide at a second angle, different from the first angle, to steer the steerable eyebox from the first position to a second position within the eyebox region that matches the pupil position.

2. The near-eye optical system of claim 1, further comprising:
   processing logic configured to drive the tiltable reflector to a particular position to redirect the visible light beams into the lightguide at the second angle, in response to receiving the tracking signal generated by the sensor,
   wherein the steerable eyebox is smaller than the eyebox region.

3. The near-eye optical system of claim 1, further comprising:
   a polarized beam splitter (PBS), wherein the infrared illumination light is a first polarization orientation and the returning infrared light is a second polarization orientation that is opposite the first polarization orientation, and wherein the PBS is configured to pass the first polarization orientation of the infrared illumination light to the tiltable reflector and is configured to reflect the second polarization orientation of the returning infrared light to the sensor.

4. The near-eye optical system of claim 1, further comprising:
   a display panel configured to receive the visible light beams from the lightguide and spatially modulate the visible light beams to generate the virtual images.

5. The near-eye optical system of claim 4, further comprising:
   a hot mirror disposed between the display panel and the lightguide, wherein the hot mirror is configured to reflect the infrared illumination light and the returning infrared light while passing the visible light beams to the display panel.

6. The near-eye optical system of claim 1, further comprising:
   processing logic configured to drive the tiltable reflector to a position that generates a highest intensity of the returning infrared light incident on the sensor, wherein the processing logic is configured to receive the tracking signal generated by the sensor, and wherein an intensity of the returning infrared light is included in the tracking signal.

7. The near-eye optical system of claim 1, further comprising:
   processing logic configured to drive the tiltable reflector to a position that centers the returning infrared light incident to a middle of the sensor, wherein the processing logic is configured to receive the tracking signal generated by the sensor.

8. The near-eye optical system of claim 1, wherein the tiltable reflector includes a microelectromechanical system (MEMS) tiltable mirror.

9. The near-eye optical system of claim 1, wherein the sensor includes at least one of a photodiode, a plurality of photodiodes, a quad sensor, an image sensor, or a charge-coupled device (CCD) light sensor.

10. The near-eye optical system of claim 1, further comprising:
    an aperture stop element disposed in the optical path of the returning infrared light between the tiltable reflector and the sensor.

11. A device, comprising:
    a lightguide;
    a tiltable reflector configured to receive visible light beams and redirect the visible light beams into the lightguide at a first angle, wherein the lightguide is configured to outcouple the visible light beams to present virtual images to a steerable eyebox located at a first position within an eyebox region;
    a display panel configured to receive the visible light beams from the lightguide and spatially modulate the visible light beams to generate the virtual images;
    a hot mirror disposed between the display panel and the lightguide;
    a light source configured to emit illumination light, wherein the tiltable reflector is configured to redirect the illumination light to the eyebox region via the lightguide and hot mirror; and
    a sensor configured to generate a tracking signal in response to returning light becoming incident onto the sensor via the tiltable reflector,
    wherein the tracking signal indicates a pupil position,
    wherein the lightguide is configured to receive the returning light from the eyebox region and direct the returning light to the tiltable reflector, and
    wherein in response to the tracking signal, the tiltable reflector is configured to redirect the visible light beams into the lightguide at a second angle, different from the first angle, to steer the steerable eyebox from the first position to a second position within the eyebox region that matches the pupil position.

12. The device of claim 11, further comprising:
    processing logic configured to drive the tiltable reflector to a particular position to redirect the visible light beams into the lightguide at the second angle, in response to receiving the tracking signal generated by the sensor,
    wherein the steerable eyebox is smaller than the eyebox region.

13. The device of claim 11, wherein the sensor includes at least one of a photodiode, a plurality of photodiodes, a quad sensor, an image sensor, or a charge-coupled device (CCD) light sensor.

14. The device of claim 11, wherein illumination light is near-infrared light.

15. A method, comprising:
emitting illumination light with a light source;
directing the illumination light to an eyebox region via a lightguide configured to outcouple visible light beams to present virtual images to a steerable eyebox located at a first position within the eyebox region, wherein the illumination light and the visible light beams are both incoupled into the lightguide by a tiltable reflector and propagate along an optical path within the lightguide, and wherein the tiltable reflector incouples the visible light beams into the lightguide at a first angle; and
generating a tracking signal with a sensor in response to returning light becoming incident on the sensor, wherein the tracking signal indicates a pupil position, wherein the returning light is the illumination light being reflected or scattered from the eyebox region, wherein the returning light propagates along a return optical path that encounters the lightguide and then the tiltable reflector prior to impinging on the sensor, and wherein the return optical path is a reverse of the optical path within the lightguide, and
wherein in response to the tracking signal, the tiltable reflector incouples the visible light beams into the lightguide at a second angle, different from the first angle, to steer the steerable eyebox from the first position to a second position within the eyebox region that matches the pupil position.

16. The method of claim 15, further comprising:
driving the tiltable reflector to a particular position to incouple the visible light beams into the lightguide at the second angle, in response to receiving the tracking signal generated by the sensor,
wherein the steerable eyebox is smaller than the eyebox region.

17. The method of claim 15, further comprising:
driving the tiltable reflector to a position that centers the returning light to a middle of the sensor and generates a highest intensity of the returning light incident on the sensor, wherein a positioning of the returning light with respect to the sensor and an intensity of the returning light is included in the tracking signal.

18. The method of claim 15, wherein the tiltable reflector includes a microelectromechanical system (MEMS) tiltable mirror.

19. The method of claim 15, wherein illumination light is within a visible light wavelength.

20. The method of claim 15, wherein illumination light is infrared light.

* * * * *